United States Patent [19]
Shallenberger

[11] Patent Number: 5,092,718
[45] Date of Patent: Mar. 3, 1992

[54] DRILL WITH REPLACEABLE CUTTING INSERTS

[75] Inventor: Fred T. Shallenberger, Rockford, Ill.

[73] Assignee: Metal Cutting Tools Corp., Rockford, Ill.

[21] Appl. No.: 624,588

[22] Filed: Dec. 10, 1990

[51] Int. Cl.⁵ .............................................. B23B 51/02
[52] U.S. Cl. .................................. 408/188; 407/113; 408/229; 408/713
[58] Field of Search ............... 408/233, 231, 227, 229, 408/230, 713, 187, 188; 407/113, 61

[56] References Cited

U.S. PATENT DOCUMENTS

| | | | |
|---|---|---|---|
| 4,340,327 | 7/1982 | Martins | 408/233 |
| 4,373,839 | 2/1983 | Negishi et al. | 408/233 |
| 4,687,388 | 8/1987 | Yokota et al. | 408/230 |

FOREIGN PATENT DOCUMENTS

| | | | |
|---|---|---|---|
| 9609 | 1/1985 | Japan | 408/227 |
| 213912 | 9/1987 | Japan | 408/199 |
| 229212 | 9/1988 | Japan | 408/199 |

Primary Examiner—Daniel W. Howell
Attorney, Agent, or Firm—Leydig, Voit & Mayer, Ltd.

[57] ABSTRACT

A metal cutting drill with two replaceable cutting inserts which are positioned to cut the full circumference of a hole during each one-half revolution of the drill. Each insert is triangular and includes an active cutting edge having a curved corner to enable the insert to cut near the center of the hole. Each insert may be inverted and indexed in order to bring an alternately usable cutting edge into active cutting position. By virtue of the inserts being triangular, the curved corners on the cutting edges of the two inserts may be positioned relatively close together and yet sufficient space is left between the inserts to enable the drill body to be relatively thick and strong.

11 Claims, 3 Drawing Sheets

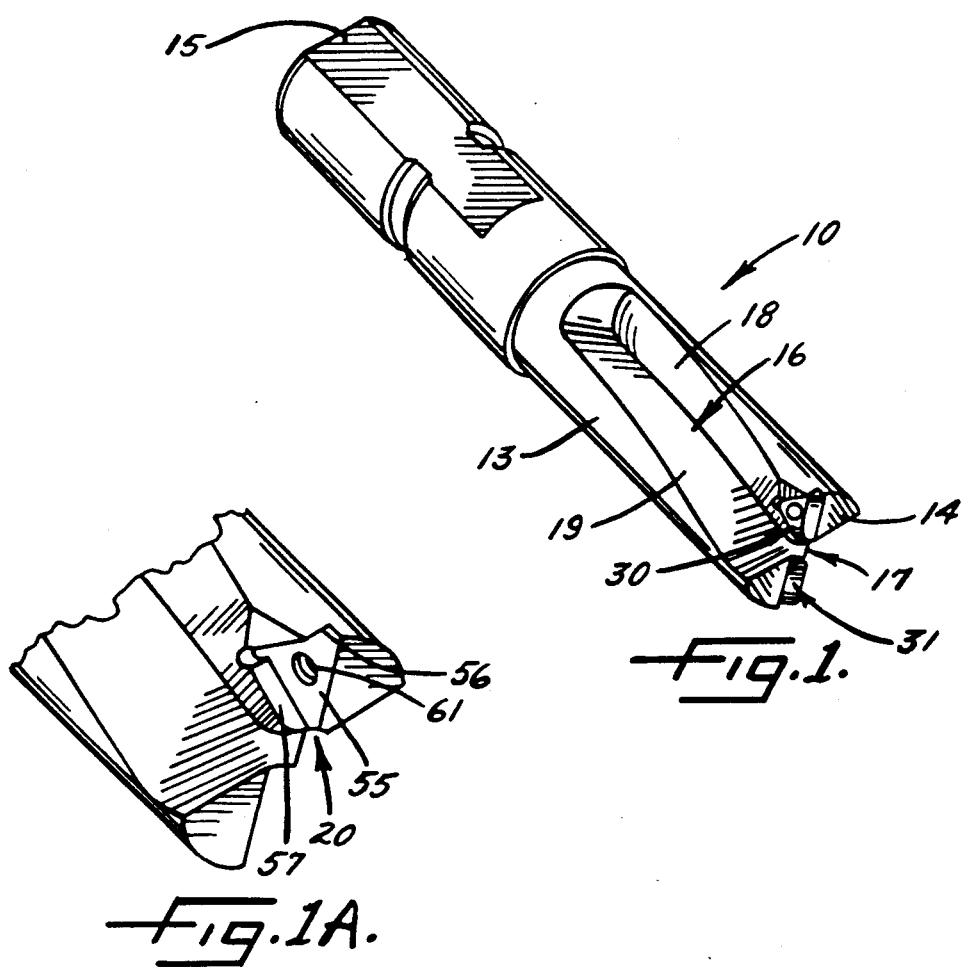
Fig. 1.
Fig. 1A.
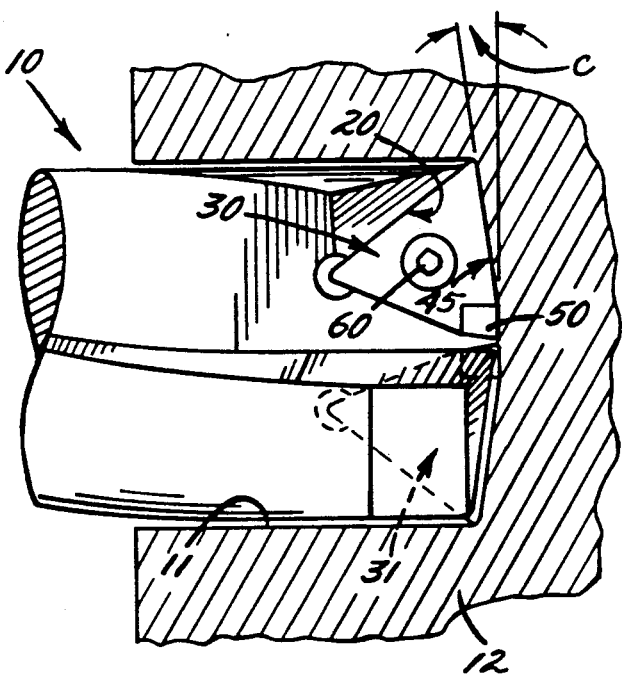
Fig. 2.

DRILL WITH REPLACEABLE CUTTING INSERTS

BACKGROUND OF THE INVENTION

This invention relates generally to a drill for forming holes in metal workpieces and, more particularly, to a drill having cutting inserts which may be easily removed and replaced after the cutting edges become worn.

A drill with a pair of indexable cutting inserts is disclosed in Shallenberger, Jr. U.S. Pat. No. 3,963,365. In that drill, one insert is an outer insert which removes metal from the peripheral wall of the hole and inwardly toward the center of the hole in a cutting arc whose width is equal to one-half the radius of the hole. The other insert is an inner insert which removes metal from the center of the hole and outwardly toward the peripheral wall of the hole in a cutting arc of substantially equal width.

While drills of the type disclosed in the Shallenberger, Jr. patent have enjoyed significant commercial success, the axial feed rate of such a drill is relatively slow due to the fact that a full revolution of the drill is required to cut the full circumference of the hole.

Negishi et al U.S. Pat. No. 4,373,839 discloses a drill which may be fed axially at a rate approximately twice that of the Shallenberger, Jr. drill. This is because the two cutting blades of the Negishi et al drill are positioned so as to cut the entire circumference of the hole during each one-half revolution of the drill. A small diameter core is left between the two blades at the center of the hole but the core is twisted off as the depth of penetration of the drill increases.

Certain embodiments of the drill disclosed in the Negishi et al patent utilize indexable cutting inserts having multiple cutting edges which may be alternately used when a given edge becomes worn. To the best of applicant's knowledge, drills of this type with indexable cutting inserts have never been marketed commercially. Inserts of the type disclosed in the patent are located so close together along their sides that the portion of the drill body between the inserts cannot be made sufficiently strong to withstand the heavy cutting forces which are imposed on the body by way of the inserts during high speed drilling.

SUMMARY OF THE INVENTION

The primary aim of the present invention is to provide a new and improved drill of the same general type as disclosed in the Negishi et al patent but having uniquely shaped cutting inserts which enable the drill to withstand heavy cutting forces while enjoying the benefits of replaceable cutting inserts.

A more detailed object of the invention is to achieve the foregoing through the provision of a drill having triangular inserts with uniquely curved cutting edges and with steeply inclined sides which enable the corners of the inserts to be positioned closely adjacent one another while leaving a strong section of drill body between the sides of the inserts.

The invention also resides in the provision of a novel triangular cutting insert having alternately usable cutting edges each formed with a convexly curved corner position.

These and other objects and advantages of the invention will become more apparent from the following detailed description when taken in conjunction with the accompanying drawings.

BRIEF DESCRIPTION OF THE DRAWINGS

FIG. 1 is a perspective view of a new and improved drill incorporating the unique features of the present invention.

FIG. 1A is an enlarged fragmentary perspective view of the tip end portion of the drill illustrated in FIG. 1 but showing the drill with one of the inserts removed.

FIG. 2 is an enlarged fragmentary side elevational view of the drill illustrated in FIG. 1 and shows the drill forming a hole in a workpiece.

DETAILED DESCRIPTION OF THE PREFERRED EMBODIMENT

Figure 3:
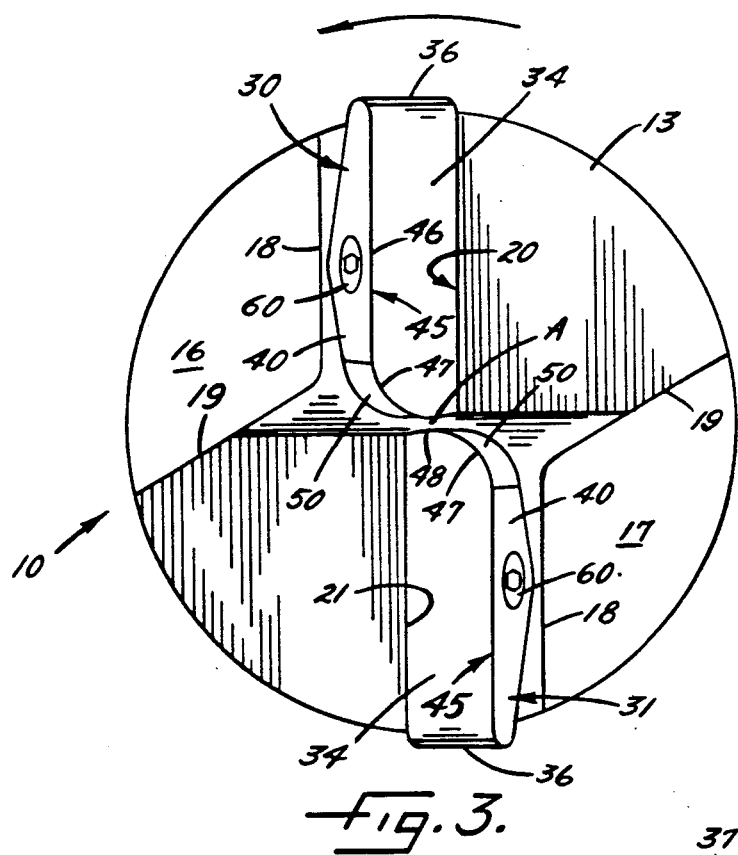
FIG. 3 is an enlarged end view of the drill.
Figure 5:
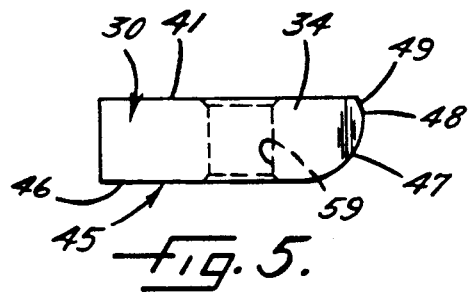
FIG. 5 is a top plan view of the insert.
Figure 4:
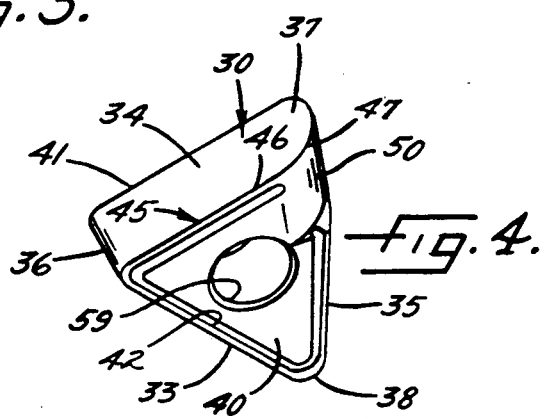
FIG. 4 is a perspective view of one of the triangular inserts.
Figure 6:
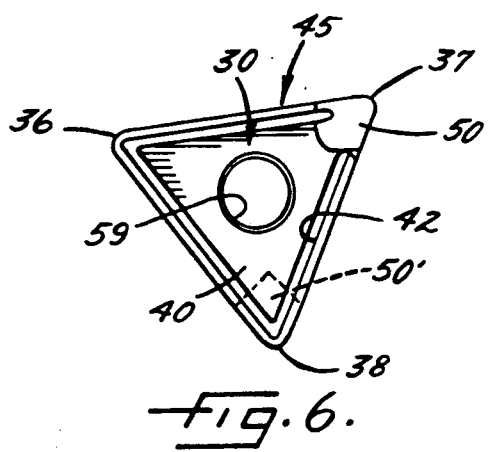
FIG. 6 is a front elevational view of the insert.
Figure 7:
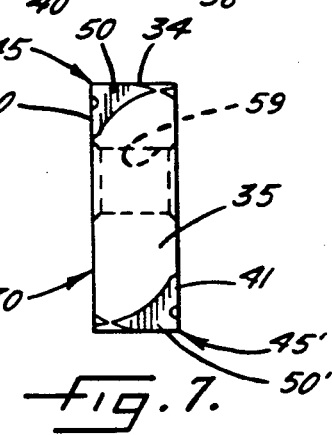
FIG. 7 is an edge view of the insert as seen from the right of FIG. 6.

As shown in the drawings for purposes of illustration, the invention is embodied in a drill 10 for forming a cylindrical hole 11 (FIGS. 2 and 8) in a workpiece 12 made of iron, steel or other metal. The drill comprises an elongated and generally cylindrical body 13 made of high carbon steel and having a tip end 14 and an opposite shank end 15. The shank end of the body is adapted to be clamped in a power-rotated holder (not shown) for effecting rotation of the drill about its own axis A (FIG. 3), the rotation herein being in a counterclockwise direction as viewed in FIGS. 1 and 3. It will be appreciated that the drill could be held rotationally stationary and that the workpiece could be rotated about the axis of the drill.

Two generally diametrically spaced flutes 16 and 17 are formed in the body and, in this particular instance, extend helically around and along the body from the tip end 14 toward the shank end 15 to enable metal chips to escape from the hole 11. Each flute is generally V-shaped in radial cross-section and is defined by a pair of walls 18 and 19. The wall 18 of each flute faces generally in the direction of rotation while the wall 19 faces generally opposite to the direction of rotation.

Generally diametrically spaced pockets 20 and 21 (FIGS. 1A and 3) are formed in the body 13 adjacent the tip end portions of the flutes 16 and 17, respectively, each pocket being formed near the wall 18 of the respective flute. Replaceable cutting inserts 30 and 31 are seated in the pockets 20 and 21, respectively, and act to cut the hole 11 in the workpiece 12 when the drill 10 is rotated counterclockwise about its axis A.

In accordance with the present invention, each of the cutting inserts 30, 31 is generally triangular in shape and is formed with a specially configured corner. As will become apparent subsequently, the use of triangular inserts enables a full circumference of the hole 11 to be cut during each one-half revolution of the drill 10 while permitting the tip end portion of the drill body 13 to be sufficiently strong to withstand heavy cutting forces imposed on the inserts.

More specifically, each of the inserts 30 and 31 is made from a block of tungsten carbide or other suitable cutting material and may be formed by modifying a conventional triangular insert of the type furnished commercially by several insert manufacturers. By way of example only, each insert may, before modification, be a type TNMG-432 insert.

The insert 30 is shown in detail in FIGS. 4 to 7, it being understood that the insert 31 is identical to the insert 30. As shown, the insert 30 is generally in the shape of an equilateral triangle and includes three sides or edge surfaces 33, 34 and 35 of substantially equal length and joining one another at three corners 36, 37 and 38. The three edge surfaces extend between two oppositely facing and generally planar face surfaces 40 and 41. In the original insert prior to modification, all three edge surfaces extend perpendicular to the face surfaces throughout the entire length of each edge surface and thus the original insert itself is of that type which is known in the art as a "negative" insert. Each face surface 40, 41 of each insert is formed with a conventional chip-breaking groove 42 (FIGS. 4 and 6) which is triangular in shape and which is located just inwardly of the periphery of the face surface.

When each insert 30, 31 is properly seated in its respective pocket 20, 21 as shown in FIG. 3, the face surface 40 of the insert faces in the direction of rotation and defines a cutting face. A cutting edge 45 is defined at the junction of the face surface 40 and the edge surface 34 and, as the cutting edge proceeds from the corner 36 toward the corner 37, it is straight along most of its length as indicated at 46. Upon approaching the corner 37, the cutting edge 45 starts curving convexly and curves convexly out of the plane of the face surface 40 and toward the plane of the face surface 41 as the cutting edge proceeds around the corner. The curved portion 47 of the cutting edge 45 terminates at an inner point 48 (FIG. 5) located precisely on or just infinitesimally short of a line extending through the axis A and paralleling the straight portion 46 of the cutting edge. From the inner termination point 48 of the curved cutting edge portion 47, the inner edge surface 35 of the insert is dished outwardly as indicated at 49 in FIG. 5 so as to provide clearance during cutting. No cutting is performed beyond the termination point 48.

Formation of the curved portion 47 of each cutting edge 45 is effected by appropriately grinding the portions of the face surface 40 and the edge surface 35 adjacent the corner 37 of the insert 30, 31. As a result, the corner portion of the face surface 40 and the edge surface 35 are convexly curved as indicated at 50 in FIG. 4.

The pockets 20 and 21 for the inserts 30 and 31, respectively, each include a flat platform 55 (FIG. 1A) against which the face 41 of the insert is seated. Two side walls 56 and 57 project from each platform and are angled relative to one another so as to cause the pocket to be formed with a generally V-shaped configuration. When each insert is located in its respective pocket, the edge surfaces 33 and 35 seat against the side walls 56 and 57, respectively, and thus the corner 38 of the insert points toward the shank end 15 of the drill body 30.

A hole 59 (FIG. 4) is formed through each insert 30, 31 and extends between and perpendicular to the face surfaces 40 and 41 of the insert. To secure the inserts in the pockets 20, 21, a threaded screw or locking pin 60 (FIGS. 2 and 3) extends through each hole 59 and is threaded into a tapped hole 61 (FIG. 1A) in the platform 55. When the screw is tightened, it clamps the face surface 41 of the insert against the platform 55 and, at the same time, draws the corner 38 of the insert into the corner of the pocket 20, 21 so as to cause the edge surfaces 33 and 35 of the insert to seat tightly against the side walls 56 and 57 of the pocket.

The platform 55 of each pocket 20, 21 is inclined relative to the axis A so as to cause the cutting edge 45 of each insert 30, 31 to be disposed at a negative axial rake angle, meaning that the leading cutting face 40 of the insert is located ahead of the cutting edge 45. As a result, the edge surface 34 of each insert is tipped in such a direction as to define a clearance face and to avoid rubbing against the bottom of the hole 11 during drilling thereof. In this particular instance, the negative axial rake angle is approximately 10 degrees.

Each insert 30, 31 also is positioned such that its cutting edge 45 is located at a negative radial rake. That is to say, each cutting edge is positioned ahead of the most nearly adjacent radial line that parallels the cutting edge and thus the corner 36 of the insert behind the cutting edge clears the peripheral wall of the hole 11 so as to avoid rubbing against such wall. Herein, each cutting edge is positioned approximately 0.140" ahead of the aforementioned radial line.

The cutting edge 45 of each insert 30, 31 also is inclined at a lead angle C (FIG. 2) of about 8 degrees. As a result of the lead angle, the cutting edge 45 slopes toward the shank end 15 of the body 30 as the edge progresses outwardly toward the peripheral wall of the hole 11. This causes the center portion of the hole to be cut somewhat prior to cutting of the peripheral portion and facilitates initial penetration of the drill 10 into the workpiece 12.

Figure 8:
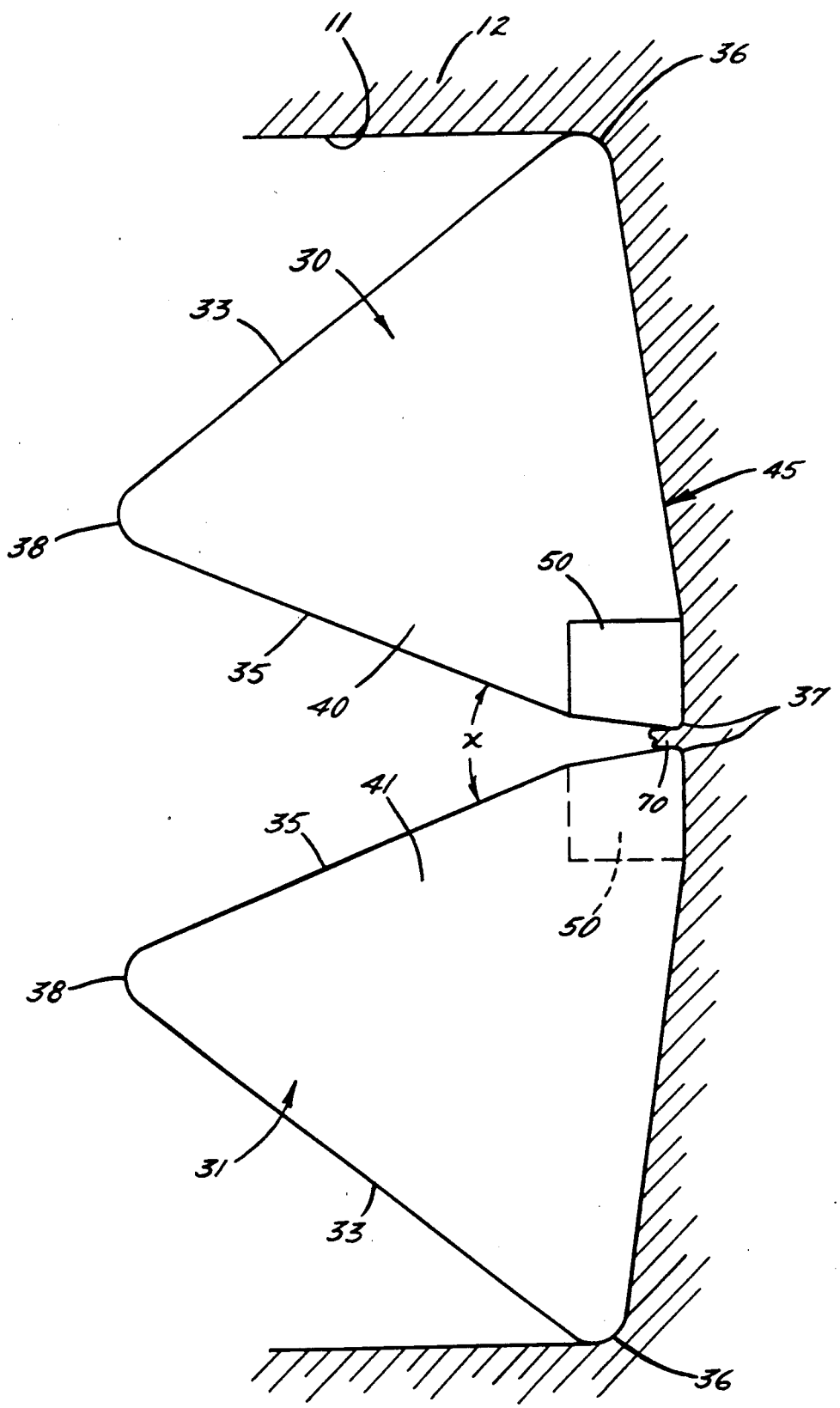
FIG. 8 is an enlarged schematic view showing the inserts drilling a hole.

With the foregoing arrangement, rotation of the drill 10 causes the cutting edge 45 of each insert 30, 31 to cut across almost a full radius of the hole 11 as is apparent from FIG. 8. Each cutting edge sweeps around one-half the circumference of the hole during each one-half revolution of the drill and thus the two cutting edges coact to cut the full circumference of the hole every one-half revolution. This enables rapid axial feeding of the drill.

Due to the curved portions 47 of the cutting edges 45, cutting occurs very close to the center of the hole 11. To avoid interference between the inserts 30 and 31, the corners 37 of the two inserts must be spaced from one another and thus a generally cylindrical core 70 (FIG. 8) is left at the bottom of the hole 11 between the inserts.

The significance of the triangular inserts 30, 31 is most apparent from FIG. 8. The inserts are positioned and angled such that the corners 37 are spaced very closely together (i.e., a spacing of between 0.5 and 1.0 millimeter) and thus the core 70 is very small in diameter. Accordingly, the core may be easily snapped off by the edge surfaces 35 adjacent the corners or simply fragmented by the tip end 14 of the drill body 13 as the body advances axially. Because the inserts are triangular, the edge surfaces 35 of the two inserts quickly diverge away from one another at a wide angle X of approximately 44 degrees as the edge surfaces progress from the tip end 14 of the drill toward the shank end thereof. Because of the wide divergence of the edge surfaces 35, significant space exists between the edge surfaces for the metal of the drill body 13. Accordingly, the body portion between the edge surfaces 35 may be comparatively thick and rugged to a point closely adjacent the corners 37 so as to impart strength to the body. In spite of the relatively large thickness of the body between the edge surfaces 35 of the triangular inserts, the fact that the edge surfaces converge toward the tip end 14 of the body allows the corners 37 to be located closely adjacent one another so that an easily breakable core 70 of only small diameter is left between the inserts.

Each insert 30, 31 preferably is formed with an alternately usable cutting edge 45' which is formed along the junction of the face surface 41 with the edge surface 33. Other than for location, the cutting edge 45' is identical to the cutting edge 45 and includes straight and curved portions similar to the straight and curved portions 46 and 47 of the cutting edge 45. The straight portion of the cutting edge 45' starts at the corner 36 and extends to a curved portion located at the corner 38. The curved portion of the cutting edge 45' is defined by forming a convexly curved portion 50' (FIG. 7) on the face 41 of the insert.

After the cutting edge 45 of each insert 30, 31 has become worn, the insert may be removed from the pocket 20, 21. By both inverting and indexing the insert, the cutting edge 45' may be brought into active cutting position. Accordingly, each insert includes two alternately usable cutting edges and thus the insert need not be discarded until both edges have been worn.

From the foregoing, it will be apparent that the present invention brings to the art a new and improved drill 10 with multi-edged indexable inserts 30 and 31 which cut a full circumference of the hole 11 across virtually its full diameter during each one-half revolution of the drill. As a result, the drill may be fed axially at a rapid rate. Because the inserts are triangular, adjacent corners 37 of the inserts may be positioned very close together and yet a thick section of drill body 13 may be located between the inserts near the corners 37 so as to impart strength to the drill body.

I claim:

1. A drill comprising an elongated and generally cylindrical body having a predetermined axis, said body having a tip end portion with an outer periphery, first and second pockets formed in the tip end portion of said body on generally diametrically opposite sides of said axis, and first and second cutting inserts seated within said first and second pockets, respectively, and removably secured to said body, each of said inserts being generally triangular and each having three sides of substantially equal length, each of said inserts having substantially flat and parallel faces bounded by said sides, there being a corner at the junction of each side of each insert with each adjacent side, each of said pockets being generally V-shaped and embracing two dies of the respective insert, the third side of each insert having a cutting edge extending transversely of the body adjacent the tip thereof from a first corner located outwardly of said outer periphery to a second corner located short of said axis, each cutting edge being straight upon proceeding from said first corner toward said second corner and curving convexly out of the plane of said first face and toward the plane of said second face upon approaching said second corner.

2. A drill as defined in claim 7 in which the curved portion of the cutting edge of each insert terminates short of the plane of said second face.

3. A drill as defined in claim 2 in which the curved portion of the cutting edge of each insert terminates on or just short of a straight line extending through said axis and extending parallel to the straight portion of the cutting edge.

4. A drill as defined in claim 1 in which each cutting edge is formed at the junction of said first face with said third side, and a substantially identically shaped cutting edge formed at the junction of said second face with another one of said sides.

5. A drill comprising an elongated and generally cylindrical body having a predetermined axis and rotatable in a predetermined direction about said axis, said body having a tip end portion with an outer periphery and having an opposite shank end portion, first and second flutes formed in said body on generally diametrically opposite sides thereof and extending from said tip end portion toward said shank end portion, each of said flutes being generally V-shaped in radial cross-section and each being defined by a pair of walls, first and second pockets formed in the tip end portion of said body on generally diametrically opposite sides of said axis, said first pocket being formed adjacent one wall of said first flute, said second pocket being formed adjacent the corresponding wall of said second flute, each of said pockets being generally in the shape of a V and each being defined by a platform facing in the direction of rotation of said body and by a pair of sides extending from said platform, the apex of the V of each pocket pointing toward the shank end portion of said body, first and second cutting inserts seated within said first and second pockets, respectively, and removably secured to said body, each of said inserts being generally triangular and having one face surface seated against the platform of the respective pocket and an opposite face surface facing in the direction of rotation of said body and defining a cutting face, each of said inserts having three edge surfaces of substantially equal length and extending between said face surfaces, there being a corner at the junction of the edge surface of each insert with each adjacent edge surface, two of the edge surfaces of each insert being seated against the sides of the respective pocket, the third edge surface of each insert extending transversely of said body adjacent the tip thereof, and a cutting edge defined along the junction of the third edge surface of each insert with the cutting face thereof, each cutting edge extending transversely of the body from a first corner of the insert located outwardly of said outer periphery toward a second corner located short of said axis, each cutting edge having a straight portion which proceeds from said first corner toward said second corner and having a curved portion extending from said straight portion and curving convexly around said second corner and toward the respective platform.

6. A drill as defined in claim 5 in which the cutting face of each insert is generally flat but is convexly curved toward said platform adjacent said second corner so as to form said curved portion of said cutting edge.

7. A drill as defined in claim 5 in which each insert includes a third corner, there being an alternately usable cutting edge extending from said first corner to said third corner and defined along the junction of said one face surface with one of said edge surfaces, said alternately usable cutting edge having a straight portion extending from said first corner and having a convexly curved portion adjacent said third corner.

8. A cutting insert formed from a generally triangular block of cutting material having first and second generally flat and parallel face surfaces, first, second and third edge surfaces of substantially equal length extending between said face surfaces, there being a corner at the junction of each edge surface with each adjacent edge surface, a cutting edge defined along the junction of one of said edge surfaces with said first face surface, said cutting edge having a straight portion which proceeds from a first one of said corners toward a second one of said corners and having a curved portion extending from said straight portion, said curved portion curving convexly around said second corner and in a direction out of the plane of said first face surface and toward the plane of said second face surface.

9. A cutting insert as defined in claim 8 in which said first face surface curves convexly toward said second face surface adjacent said second corner so as to form said curved portion of said cutting edge.

10. A cutting insert as defined in claim 9 in which said curved portion of said cutting edge terminates short of said second face surface.

11. A cutting insert as defined in claim 8 in which said insert includes a third corner, there being an alternately usable cutting edge extending from said first corner to said third corner and defined at the junction of said second face surface with another one of said edge surfaces, said alternately usable cutting edge having a straight portion proceeding from said first corner and having a curved portion which curves convexly around said third corner.

* * * * *